United States Patent Office 3,422,344
Patented Jan. 14, 1969

3,422,344
QUANTUM OPTICAL DETECTION SYSTEMS WITH TWO ALKALI RESONANCE CELLS
Léon Malnar, Paris, France, assignor to CSF—Compagnie Generale de Telegraphie Sans Fil, a corporation of France
Filed Sept. 22, 1965, Ser. No. 489,253
Claims priority, application France, Oct. 2, 1964, 990,115
U.S. Cl. 324—.5    5 Claims
Int. Cl. H01s; G01n 27/00; G01r 33/08

ABSTRACT OF THE DISCLOSURE

The invention relates to optical pumping systems and more particularly to an optical pumping magnetometer wherein a resonance cell is provided which contains two alkali elements. One of said elements is optically pumped by means of a suitable light source in order to align the atoms of said other elements by a spin exchange collision process; the Zeeman spectral lines of said other element are optically detected to supply a measurement of the magnetic field intensity which is not affected by the orientation of the magnetometer with respect to the magnetic field vector.

Figure 1:
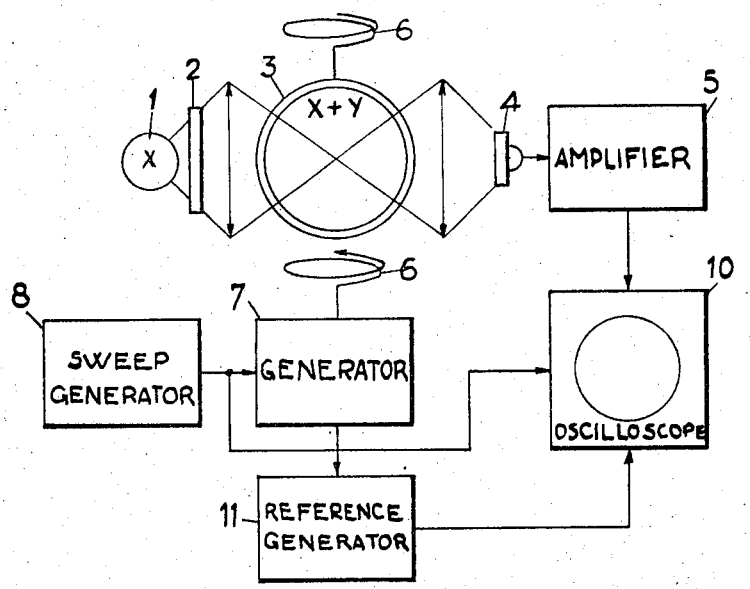

The present invention relates to optical pumping. Magnetometer, atomic clocks and other systems based on optical pumping are well known in the art of quantum electronics. These systems are based on the radio-frequency transitions of an alkaline vapour which has previously been submitted to optical pumping. Clocks and magnetometers constructed according to this technique are characterized by their excellent stability or their high sensitivity. However, such systems have the drawback of being sensitive to the direction of an external magnetic field. This drawback is particularly trouble-some when the optical pumping systems are placed on board a moving vehicle or body.

It is an object of this invention, to avoid this drawback.

According to the invention there is provided an optical pumping system comprising in combination: a source of light containing a first alkaline element; a resonance cell containing said first element and a second alkaline element having a plurality of distinct absorption lines in a predetermined radio-frequency band; a photoelectric element positioned for receiving light from said source through said cell, and frequency measuring means connected to said photoelectric element for determining the resonance frequencies of said second element.

Figure 2:
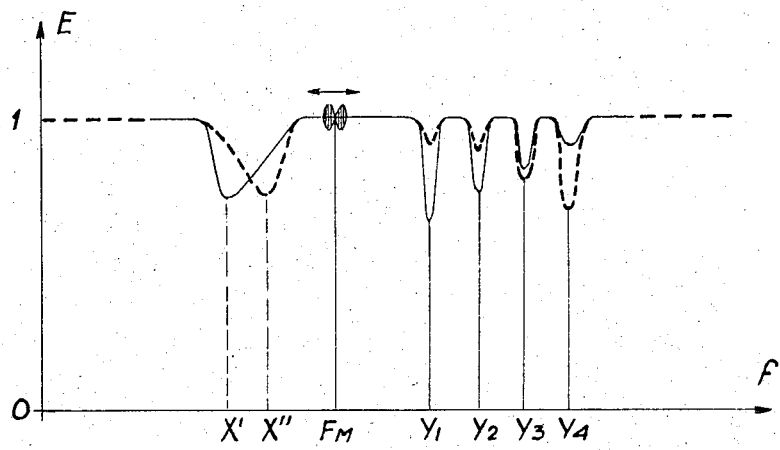
Figure 3:
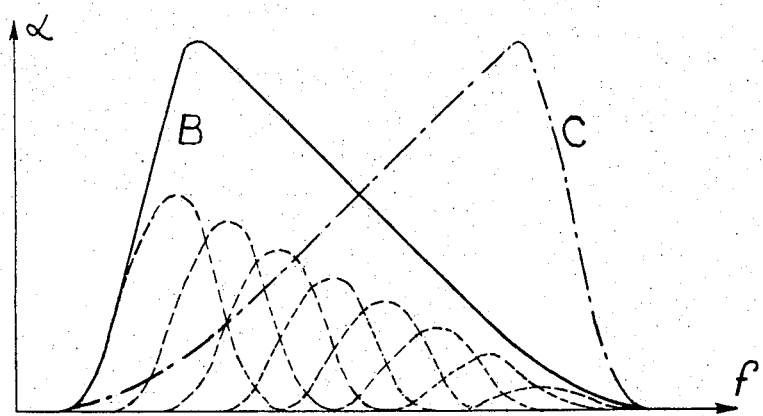
Figure 4:
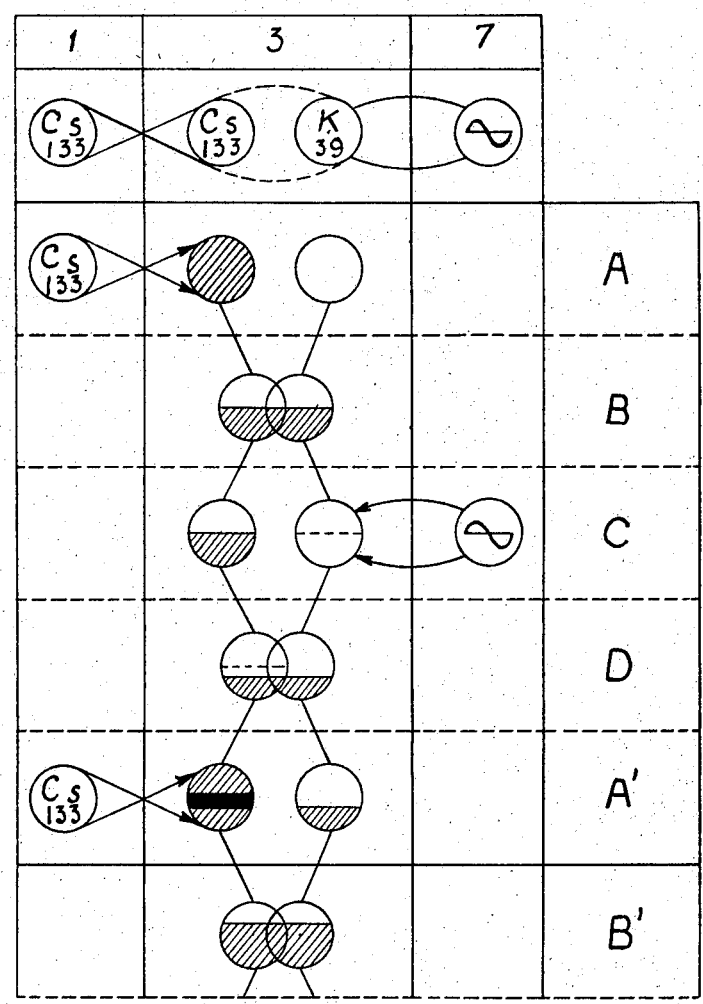

For a better understanding of the invention and to show how the same may be carried into effect reference will be made to the drawing accompanying the following description and wherein:

FIG. 1 is a diagram of a magnetometer arranged according to the invention;
FIG. 2 is an absorption characteristic;
FIG. 3 is an explanatory diagram; and
FIG. 4 is a table illustrating the process of the collision in the pumped substance.

The magnetometer including an optical pumping system according to the invention shown in FIG. 1 comprises a resonance cell 3 containing an alkaline vapour. It differs from known systems of this type by the fact that alkaline vapour has two different constituents X and Y instead of one. This vapour undergoes, as well known in the art, quantum transformations under the action of circularly polarized light and of an alternating magnetic field applied through inductor coils 6. The polarized light is produced by a source 1 including a quarter wavelength plate 2. The alternating field is produced by a variable frequency generator 7. The vapour contained in the cell is subjected to the magnetic field which is to be measured, i.e. an external magnetic field.

The magnetometer system further further comprises a photoelectric cell 4 which collects the light propagated through the vapour. This cell is connected for example to the vertical plate input of an oscilloscope 10 through an amplifier 5. The horizontal plate input of the oscilloscope receives the saw-tooth voltage of a sweep generator 8 which modulates the generator 7 in frequency. A reference generator 11 supplies marker pips by means of which one can accurately locate any given frequency of the explored frequency band, as well known in the art.

Under the action of the external magnetic field

Ho and by the virtue of the Zeeman effect, hyperfine structure levels split into groups of Zeeman sub-levels. The spacing of these sub-levels is a function of the intensity of the field Ho and varies slightly within the same group of sub-levels. Considering, for example, the hyperfine level F=4 of the fundamental state 6S½ of Caesium-33, there are obtained 9 sub-levels separated by eight spacings depending on the intensity of the magnetic field to be measured. The measurement consists therefore in displaying these spacings by inducing energy transitions between the sub-levels; in order to induce these transitions, it is necessary to modify the distribution of the atom populations between the sub-levels since, in view of Boltzmann's law, in the absence of irradiation there is substantial equidistribution.

In order to bring the vapour in the state in which such transitions can occur under the action of the alternating field, there is systematically created unbalance in the populations between the sub-levels. This preliminary effect is obtained by means of the optical pumping which consists in a suitable irradiation of the vapour by means of a circularly polarized light. As is well known, the nature of the obtained unbalance is a function of the intensity of the light and of the sense in which circular polarization of the light takes place. For a predetermined orientation of the external field

Ho the unbalance obtained by means of the pumping, i.e. the population difference is not evenly distributed between the sub-levels. The optical pumping by means of circularly polarized light increases the populations of upper sub-levels and decreases the populations of lower sub-levels or vice-versa. The sense of the circular polarization with respect to the field

Ho determines which one among those two situations will be obtained. Of course, a reversal of the field direction will also reverse the situation. Consequently the optical pumping is sensitive to the direction of the field vector

Ho and gives rise to unequal amounts of unbalance between sub-levels; this "rotation effect" merely concerns the distribution of the atoms between the sub-levels and does not affect the magnitude of the energy gaps since the Zeeman splitting is entirely controlled by the intensity of the magnetic field.

According to the foregoing, the optically pumped vapour behaves asymmetrically in the presence of the alternating resonance field. While sweeping the frequency band of generator 7, one encounters several transitions which are displayed locally on the oscilloscope in the form of dips or valleys corresponding to the absorption of the light. In fact, whenever the frequency of the alternating field coincides with one of the transitions between sub-levels, the optical pumping restores the unbalance in the populations which has been compensated by the application of the alternating field.

Finally, there is obtained on the oscilloscope the absorption characteristic shown in FIG. 2. In the case where the cell is filled with two elements X and Y, this curve shows in full lines several absorption valleys or dips. The dotted line shows the changes occurring when the direction of the external magnetic field is modified. The figure indicates the presence of a first absorption line, showing the presence of the element X and a separate group of lines Y1, Y2, Y3 and Y4 which indicate the presence of the element Y. The effect of the rotation affects the distribution of the amplitudes, but in the case of the element X it affects also the frequency localization of the valley which shifts from X′ to X″. The cause of this phenomenon will be explained.

FIG. 3 shows as a function of the frequency the selective absorption curves of an alkaline element X usually used in resonance cells, i.e. an element which can also be used in the source of light: the absorption curves relating to the different spacings between the sub-levels are plotted in dotted lines. The symmetrical absorption curves do not coincide entirely since, as already mentioned, the spacings are not equal. However, since they are only slightly different the curves encroach upon each other and only the sum B thereof may be observed on the screen of the scope 10. The asymmetry of the curve B is due to the optical pumping because of which the resonance amplitude decreases from the left to the right. If the orientation of the external field is reversed, a resonance curve C is obtained in which the elementary amplitudes decrease from the right to the left.

In order to cancel this rotation effect during a measurement in the presence of a magnetic field with any given orientation, the invention provides for the detection of the resonance by means of a constituent Y, added to the vapour of element X and whose elementary lines are distinctly separated from each other because the spacings of its sub-levels are distinctly different.

The following table summarizes the properties of some alkaline elements which can according to the invention serve as constituents X or Y as the case may be for the resonance cell; the spacings between the elementary lines are expressed in γ and are valid for a field intensity of 50,000γ.

| Element | Symbol | Number of spacings | Spacing between sub-levels (γ) | Total dispersion (γ) |
| --- | --- | --- | --- | --- |
| Caesium 133 | Cs | 8 | 1.9 | 13.3 |
| Rubidium 87 | Rb | 4 | 5.2 | 15.6 |
| Potassium 39 | K | 4 | 76.0 | 288.0 |

Potassium has a sufficient spacing to provide resolved lines, but this element is unsuitable for building up a pumping light source since it has too short a useful life and would destroy the envelope of the source of light at the operating temperature. This is the reason why the known system use caesium or rubidium, both for the source 1 of light and for the cell 3. This, however, results in the drawback that the system is sensitive to the direction of the ambient magnetic field.

In the system according to the invention, an alkaline vapour is used, which is formed by a mixture of a pumping constituent X, suitable for use in the source of light, and a constituent Y having clearly distinct resonance lines. This new association makes possible the combination of the following advantages:

(a) The source of light for the optical pumping has an acceptable useful life.

(b) The resonance lines are identified separately which results in a definition of the resonance frequency, proportional to the external field, which is independent of the orientation of the external field.

Since the element Y cannot be pumped by a pumping light source with element X, only the latter is pumped. The elements X and Y exchange therefore a part of their energy, which results in a modification of the respective populations of the hyperfine levels by "spin exchange collision." Thus, the vapour in the cell as a whole behaves like a new alkaline element, combining useful properties of its two constituents, i.e. the ability of being pumped by a source comprising one of said elements and by the fact that the resonance lines are quite distinct from each other.

By way of example, it is possible to use a caesium light source and a resonance cell containing caesium as X element and potassium as Y element.

The process of energy exchange according to the invention is sketched in FIG. 4 in which the phenomena have been separated in order to make them more apparent. In fact, the phases of interaction and exchange are practically simultaneous which does not, however, change the nature of the phenomena under review.

The upper line in the table in FIG. 4 groups the source 1, the cell 3 and the generator 7 of an optical pumping system. By way of nonlimiting example, the source contains caesium as X element and the cell contains the caesium and potassium as X and Y elements, respectively.

The line A of the table represents the optical pumping. Element Cs in the cell is irradiated by the caesium source which leads to an unbalance in the populations as mentioned above. This fact is indicated by the shading of the circle representing Cs. Potassium remains unaffected by the irradiation of the source.

The line B of the table represents the first exchange. The elements Cs and K enter into collision and equalize their respective unbalances which is indicated by an even distribution of the shaded area between the two circles representing the elements of the cell 3.

The line C represents the interaction with the radiofrequency field provided by generator 7; the unbalance of populations in elements K is cancelled.

The line D represents the second exchange during which caesium communicates again its unbalance to potassium.

The line A′ represents the optical pumping of elements Cs which provides the optical detection resonance of element K with the applied alternating magnetic field. The black band symbolizes the part of the pumping light which is absorbed in order to compensate for the resonance in potassium shown in the line C of the table.

Actually the procedure, examined here step by step, takes place continuously with an exchange probability of ½. The process of the invention can obviously be applied to any arrangement based on the optical detection of a resonance by means of an optically pumped vapour.

The system shown in FIG. 1 is a system for obtaining a resonance. Lamp 1 illuminates cell 3. The light absorption at resonance is detected by photo cell 4. The output signal of photo cell 4 is applied to the vertical input of oscilloscope 6 through amplifier 5. The horizontal input of the oscilloscope is fed by the modulating signal, provided by modulator 8, which also controls the frequency of generator 7. A marking oscillator 11 connected in a known manner provides a marking signal which is superimposed on the curve displayed for determining the resonance frequencies. It is essential that this reference should not be located at the apparent resonance point of the constituent X because under the rotation effect this point shifts from X' to X".

Of course, the invention is not limited to the embodiments described and shown. Thus, it is obvious that the invention also applies to systems in which the frequency $F_M$ is determined without the action of an operator. This relates, for example, to servo-magnetometers, automatic oscillators and atomic clocks which use in the resonance cell the exchange process by collision between two alkaline constituent X and Y.

What is claimed, is:

1. An optical pumping system comprising in combination: a circularly polarized source of light containing a first alkali element; a resonance cell responsive to an external magnetic field and containing said first element and a second alkali element having a plurality of distinct absorption lines in a predetermined radio-frequency band; said first element being optically pumped by said light; said second element being pumped by exchange collision with said first element; a photoelectric element positioned for receiving light from said source through said cell, and frequency measuring means connected to said photoelectric element for determining the resonance frequencies of said second element.

2. An optical pumping system comprising in combination: a circularly polarized source of light containing a first alkali element; a resonance cell responsive to an external magnetic field and containing said first element and a second alkali element having a plurality of distinct absorption lines in a predetermined radio-frequency band; said first element being optically pumped by said light; said second element being pumped by exchange collision with said first element; a photoelectric element positioned for receiving light from said source through said cell, said photoelectric element feeding display indicator means having a frequency scale for displaying on said scale, said absorption lines of said second element; and frequency calibration means feeding said display indicator means for measuring the resonance frequencies of said second element.

3. An optical pumping system comprising in combination: a circularly polarized source of light containing a first alkali element; a resonance cell responsive to an external magnetic field and containing said first element and a second alkali element having a plurality of distinct absorption lines in a predetermined radio-frequency band; said first element being optically pumped by said light; said second element being pumped by exchange collision with said first element; a photoelectric element for receiving light from said source through said cell; a high frequency generator coupled to said cell and having a frequency modulation input; a sweep oscillator connected to said modulation input; a cathode ray indicator having a horizontal input connected to said modulation input; said indicator having a vertical input connected to said photoelectric element; and a marker frequency generator having an input connected to the output of said high frequency generator, said marker generator having an output connected to said vertical input; said indicator displaying said absorption lines of said second element and said marker generator being tuned for measuring the resonance frequencies of said second element.

4. An optical pumping system comprising in combination: a circularly polarized source of light containing caesium, a resonance cell responsive to an external magnetic field and containing caesium and potassium having a plurality of distinct absorption lines in a predetermined radio-frequency band, caesium being optically pumped by said light and potassium being pumped by exchange collision with caesium; a photoelectric element positioned for receiving light from said source through said cell, said photoelectric element feeding display indicator means for displaying on a frequency scale said absorption lines of potassium; and frequency calibration means feeding said display indicator means for measuring the resonance frequencies of potassium.

5. An optical pumping magnetometer comprising in combination: a circularly polarized source of light containing a first alkali element, a resonance cell containing said first element and a second alkali element having a plurality of distinct absorption lines in a predetermined radio-frequency band, said first element being optically pumped by said light; said second element being pumped by exchange collision with said first element; a photoelectric element positioned for receiving light from said source through said cell, said photoelectric element feeding display indicator means for displaying on a frequency scale said absorption lines of said second element and frequency calibration means feeding said display indicator means for measuring the amplitude of the magnetic field surrounding said cell.

References Cited

UNITED STATES PATENTS

| | | | |
|---|---|---|---|
| 3,150,313 | 9/1964 | Dehmelt | 324—0.5 |
| 3,243,715 | 3/1966 | Welton | 324—0.5 |
| 3,252,081 | 5/1966 | Ruddock | 324—0.5 |

OTHER REFERENCES

Journal of Scientific Instruments, V. 39, No. 6, June 1962, pp. 292–299 (Parsons).

Physical Review, V. 109, No. 2, Jan. 15, 1958, pp. 381–385 (Dehmelt).

Journal of Geophysical Research, V. 63, No. 3, September 1958, pp. 513–515 (Skillman).

RUDOLPH V. ROLINEC, Primary Examiner.

MICHAEL, J. LYNCH, Assistant Examiner.

U.S. Cl. X.R.

331—94, 94.5